Figure 1:
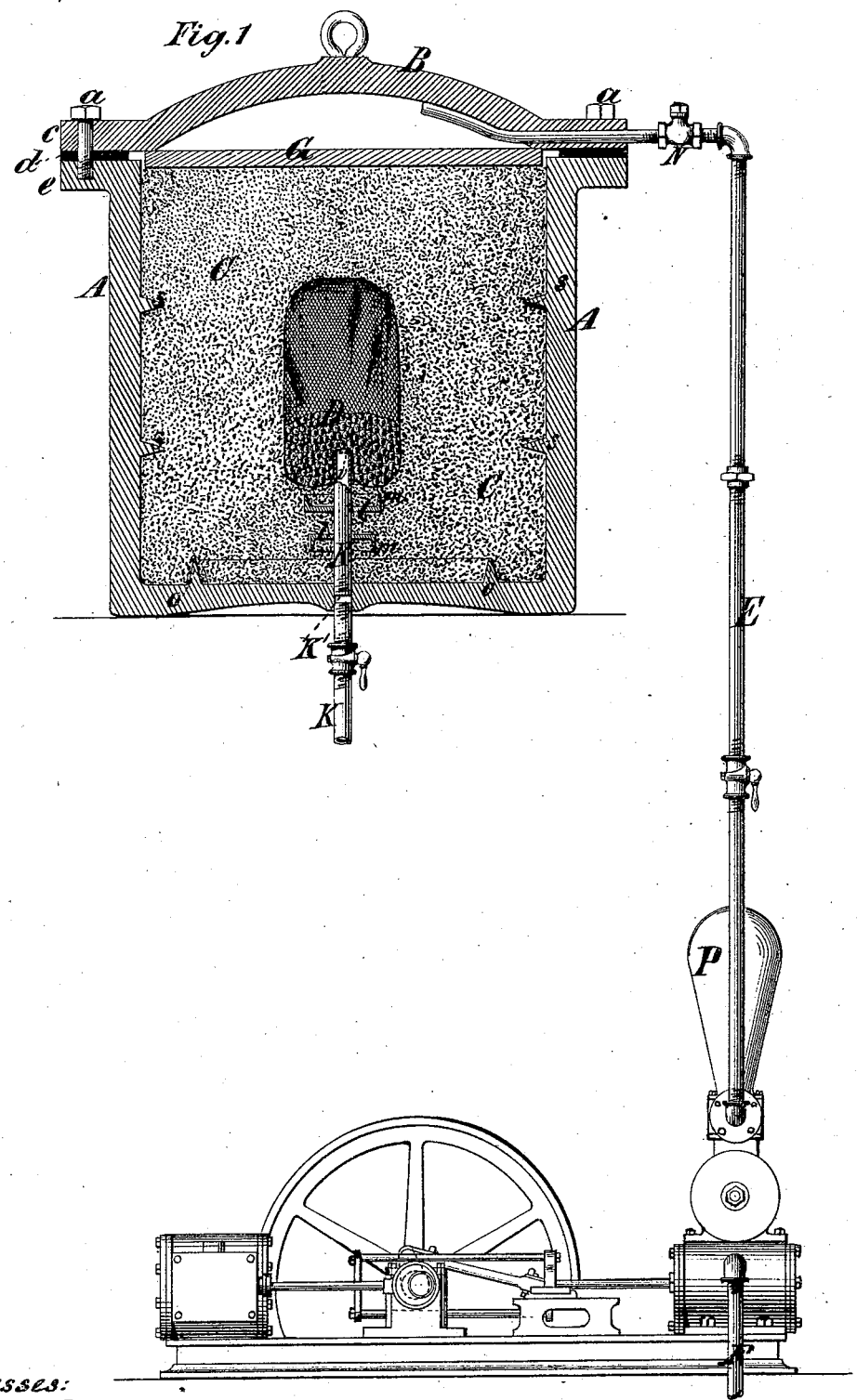

13 Sheets—Sheet 1.

T. R. SINCLAIRE.
LIQUID FILTERING APPARATUS.

No. 183,599. Patented Oct. 24, 1876.

Witnesses:
Michael Ryan,
A. J. DeLacy.

Thos. R. Sinclaire.

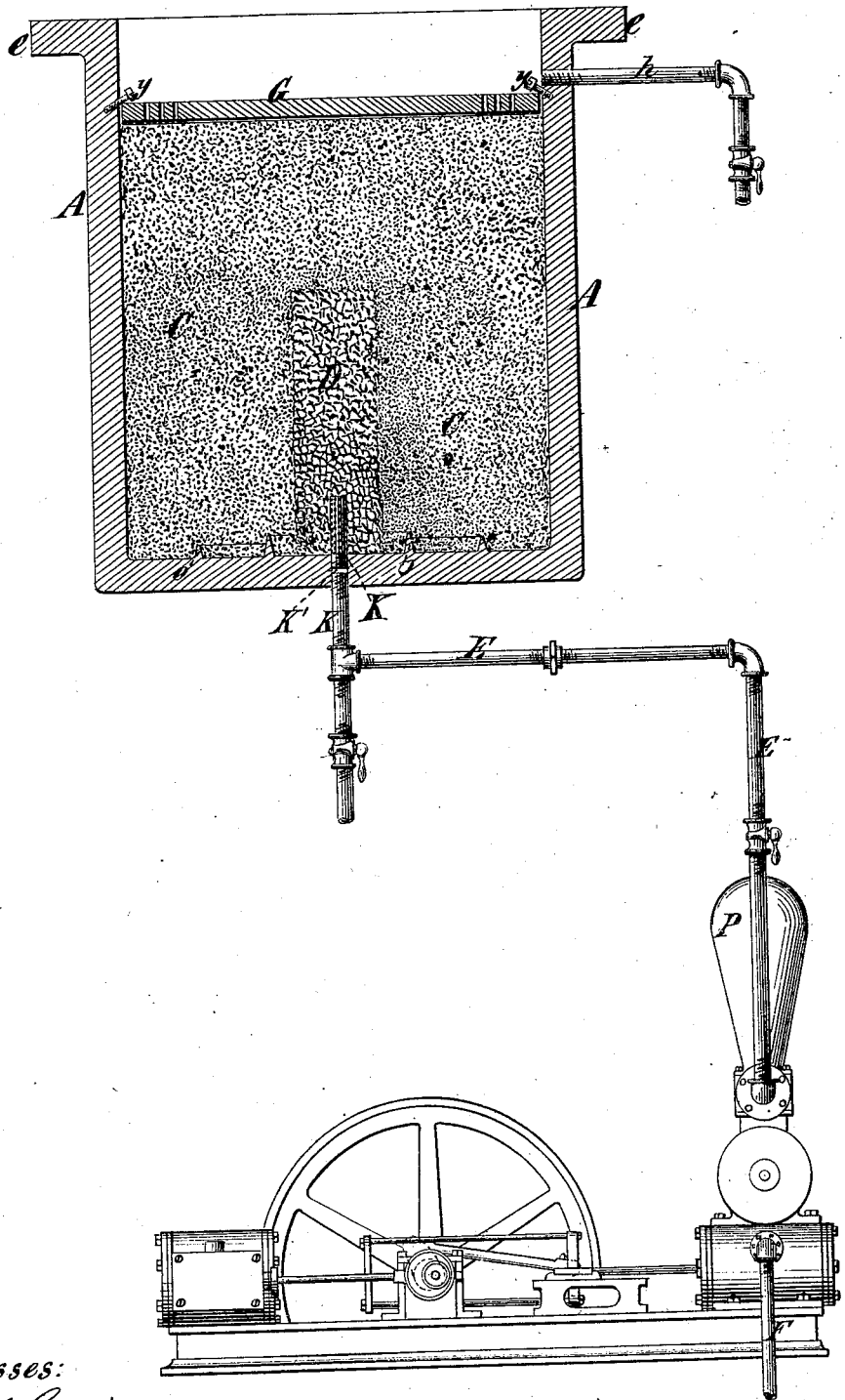

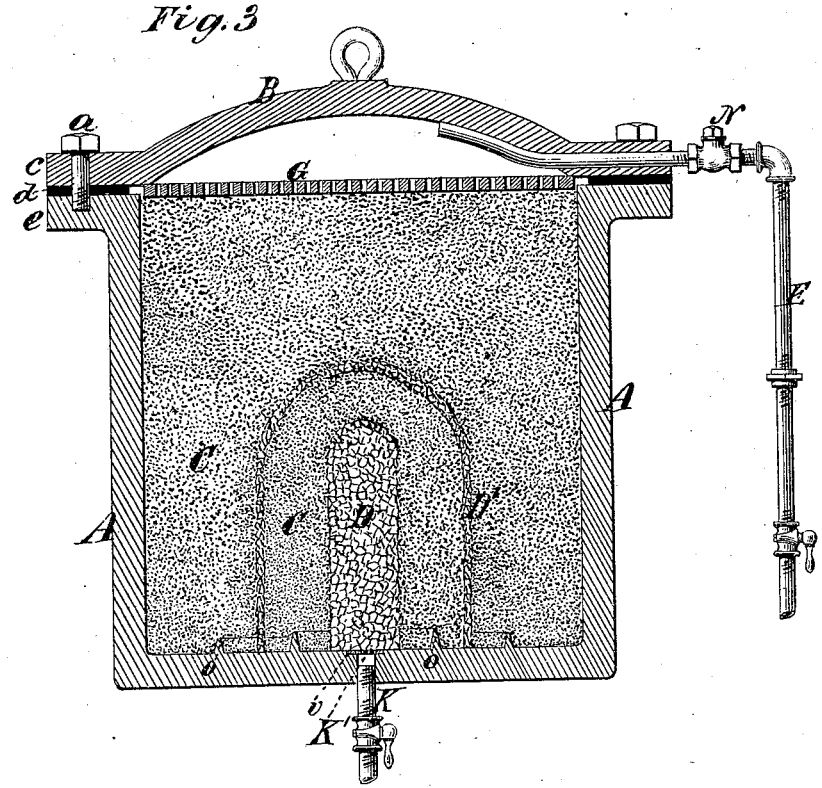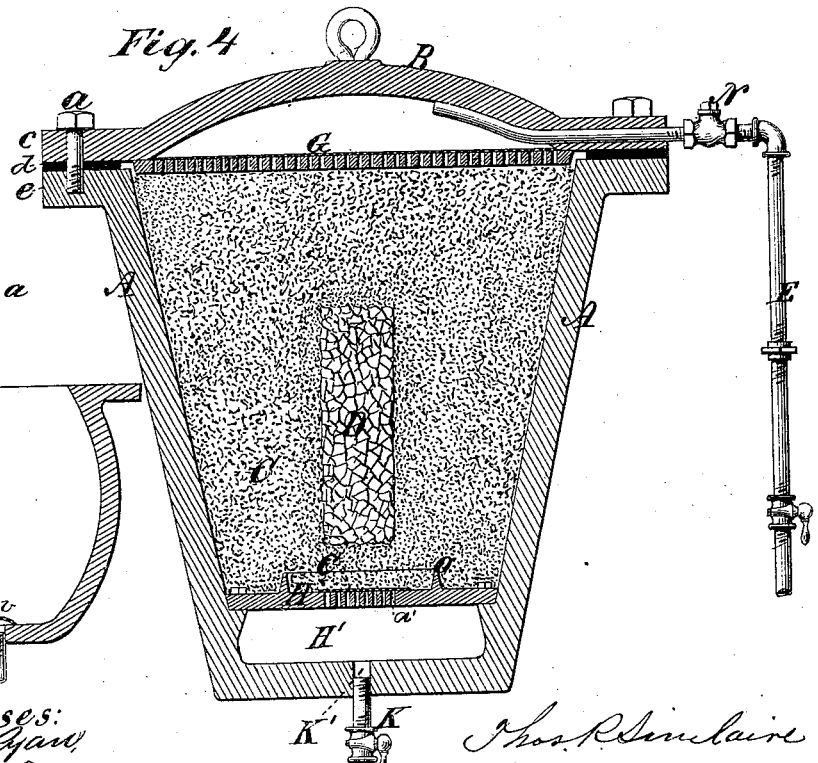

T. R. SINCLAIRE.
LIQUID FILTERING APPARATUS.

No. 183,599. Patented Oct. 24, 1876.

Witnesses:
Michael Ryan
H. J. De Lacy

Thos. R. Sinclaire

T. R. SINCLAIRE.
LIQUID FILTERING APPARATUS.
No. 183,599. Patented Oct. 24, 1876.
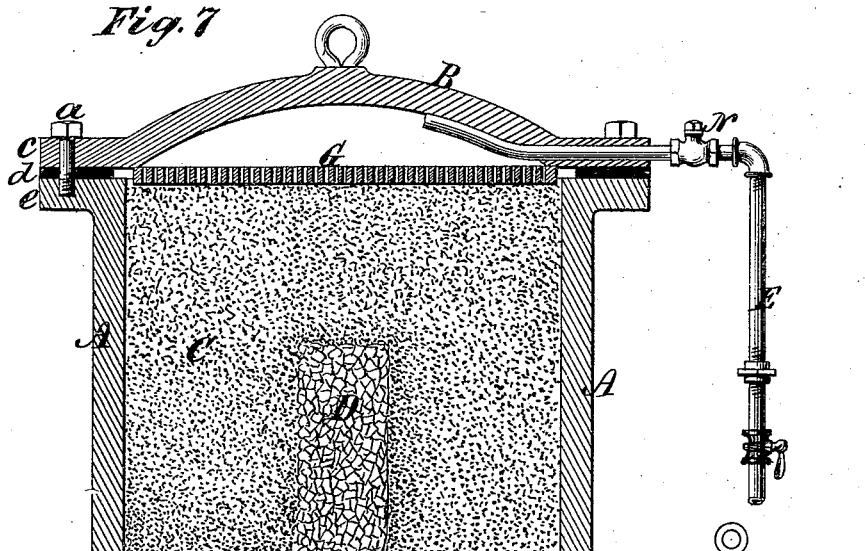
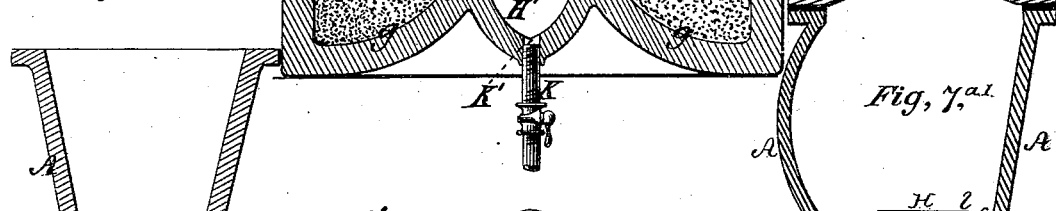
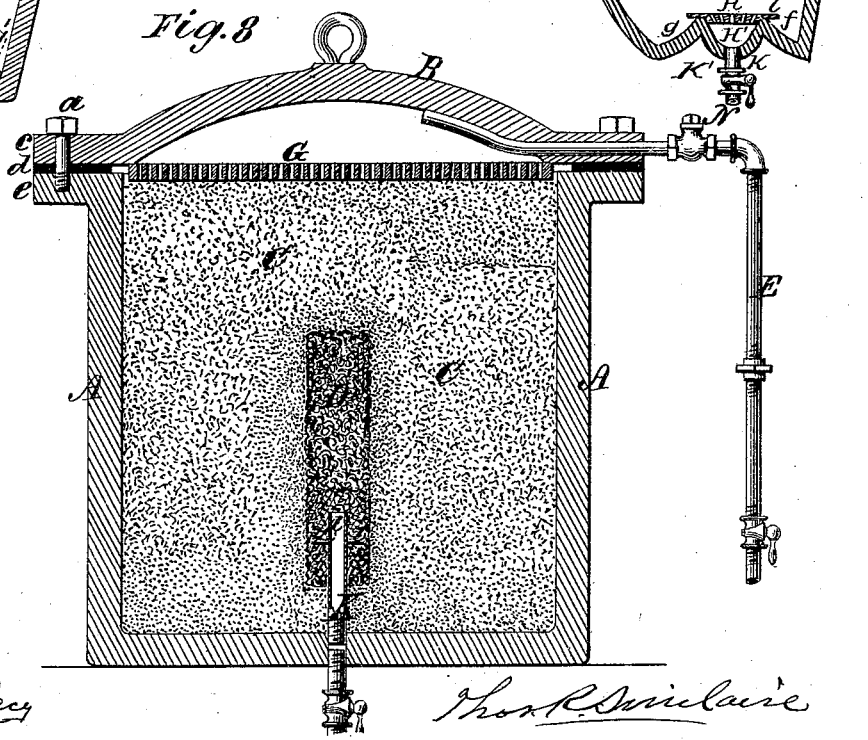
Witnesses:
W. Ryan
A. J. De Lacy
Thos. R. Sinclaire 13 Sheets—Sheet 6.
T. R. SINCLAIRE.
LIQUID FILTERING APPARATUS.
No. 183,599. Patented Oct. 24, 1876.
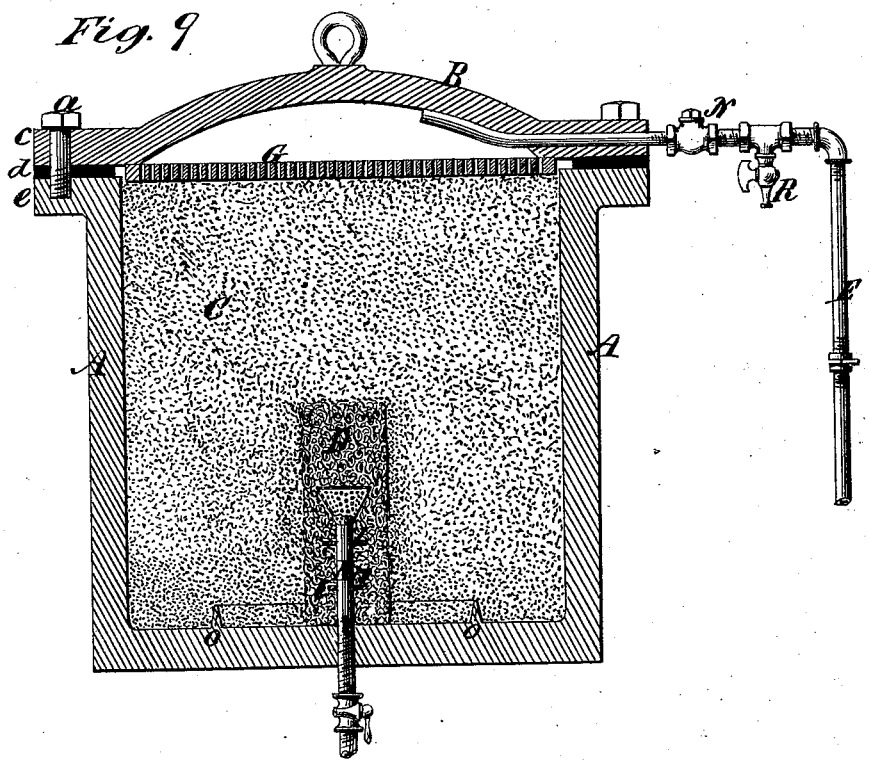
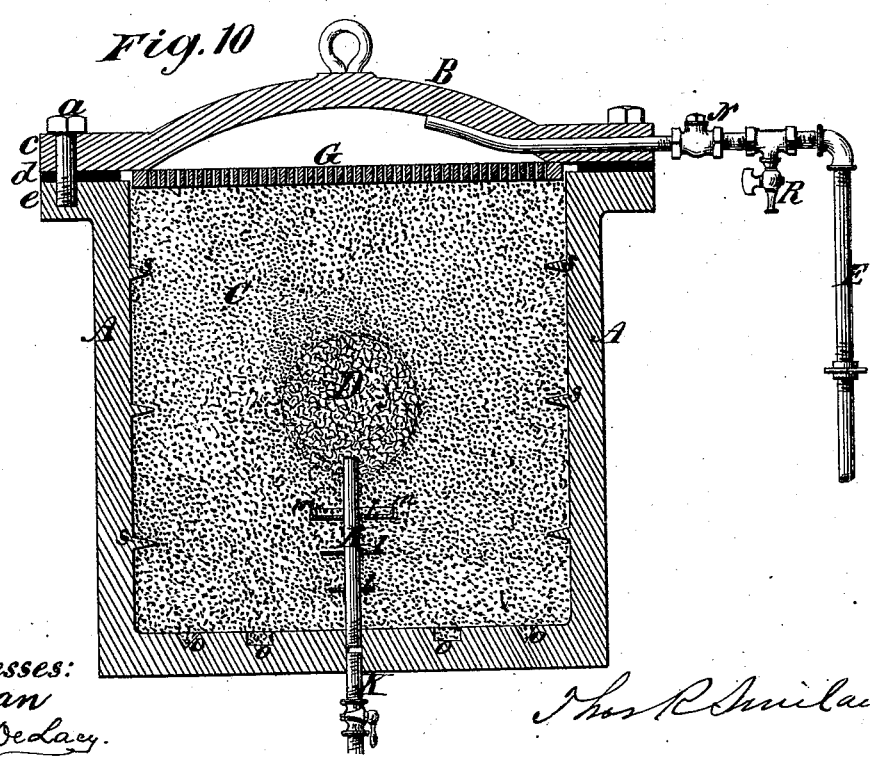

13 Sheets—Sheet 7.

T. R. SINCLAIRE.
LIQUID FILTERING APPARATUS.

No. 183,599. Patented Oct. 24, 1876.

Witnesses:
Michael Ryan
A. J. DeLay.

Thos. R. Sinclaire

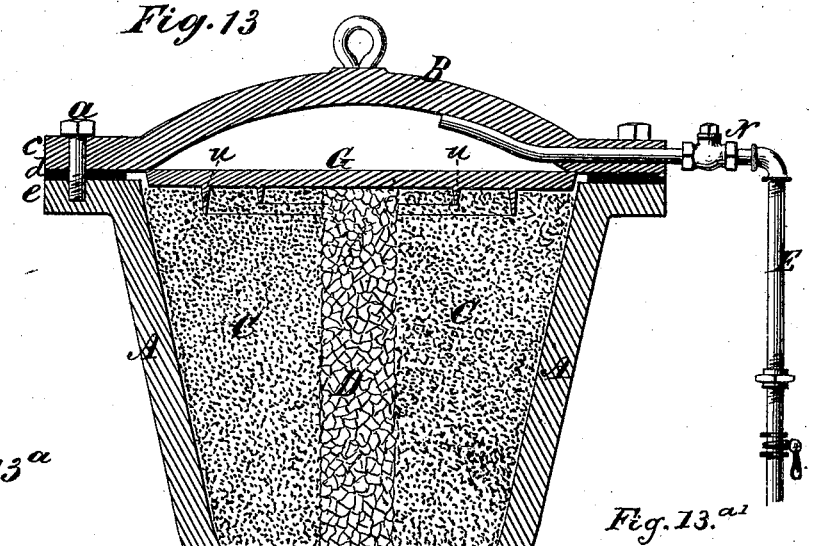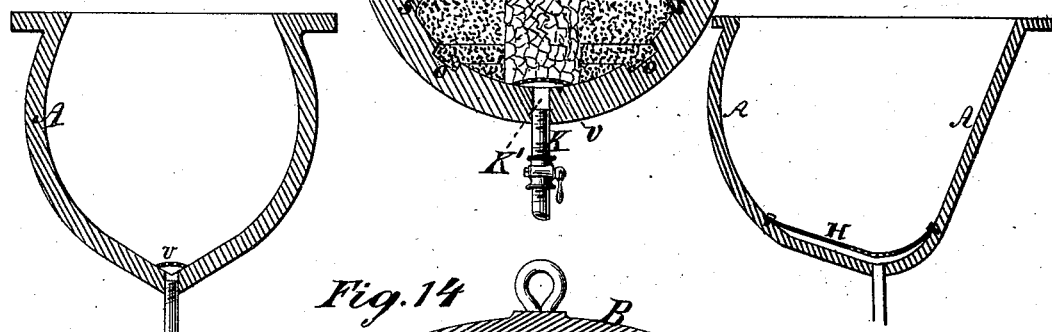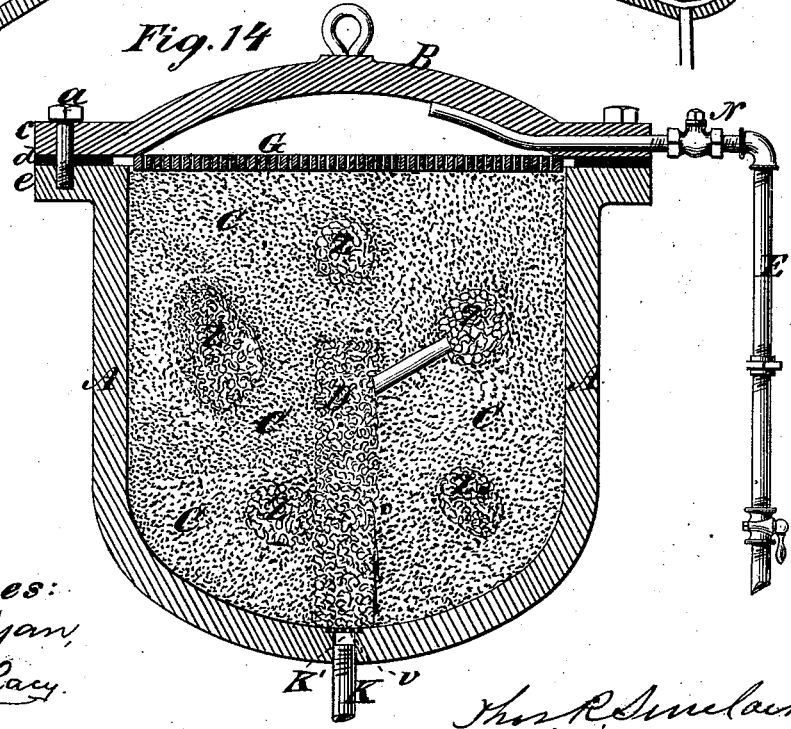

T. R. SINCLAIRE.
LIQUID FILTERING APPARATUS.

No. 183,599. Patented Oct. 24, 1876.

Witnesses:
Michael Ryan
A. J. DeLacy.

Thos. R. Sinclaire

13 Sheets—Sheet 10.

T. R. SINCLAIRE.
LIQUID FILTERING APPARATUS.

No. 183,599. Patented Oct. 24, 1876.

Witnesses
Michael Ryan
A. J. DeLacy.

Thos. R. Sinclaire

N. PETERS, PHOTO-LITHOGRAPHER, WASHINGTON, D. C.

13 Sheets—Sheet 11.
T. R. SINCLAIRE.
LIQUID FILTERING APPARATUS.
No. 183,599. Patented Oct. 24, 1876.
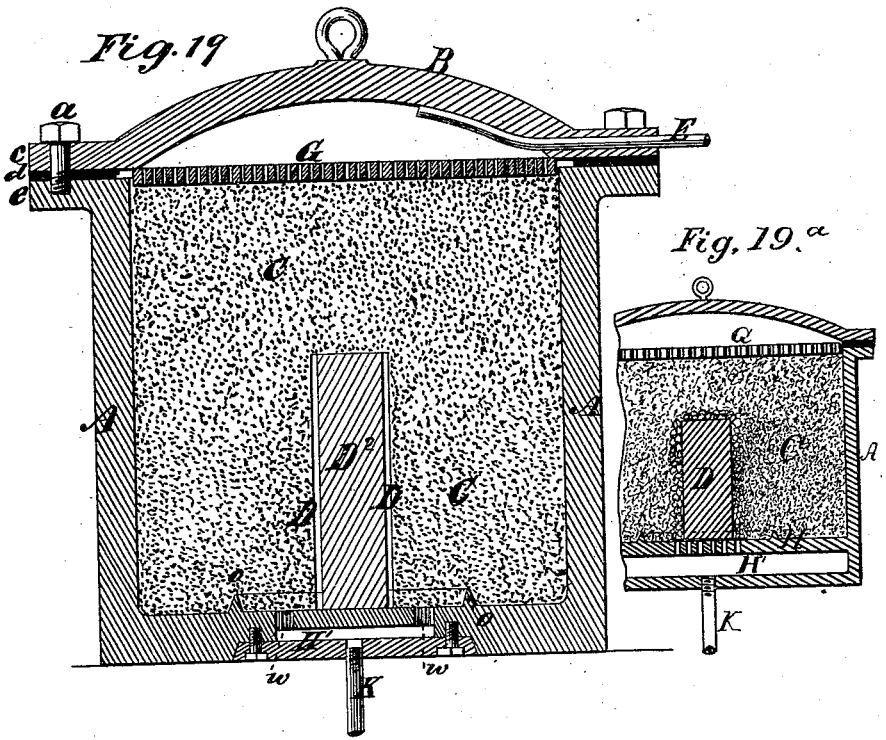
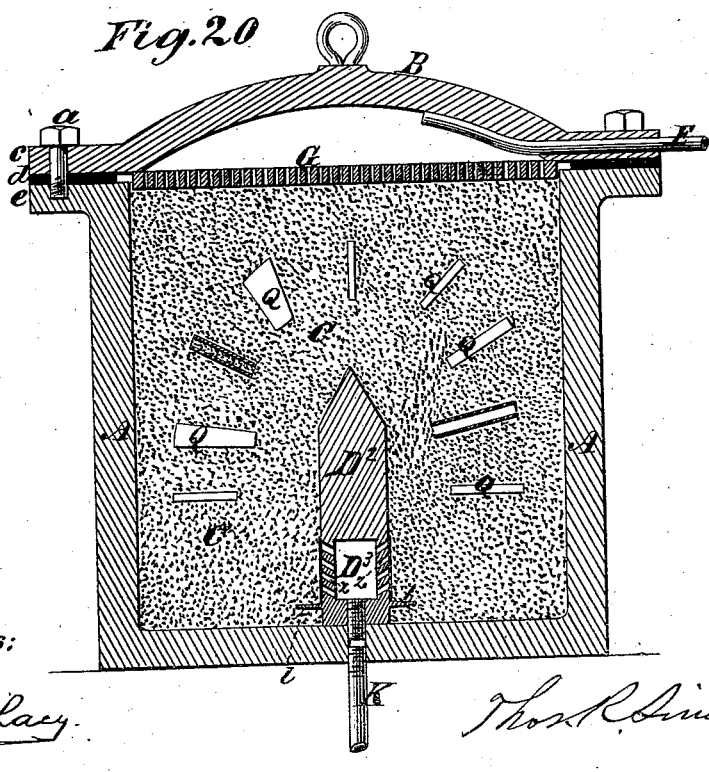
Witnesses:
M. Ryan
A. J. DeLacy.
Thos. R. Sinclaire 13 Sheets—Sheet 12.

T. R. SINCLAIRE.
LIQUID FILTERING APPARATUS.

No. 183,599. Patented Oct. 24, 1876.

Witnesses:
Michael Ryan
A. J. De Lacy

Thos. R. Sinclaire

N. PETERS, PHOTO-LITHOGRAPHER, WASHINGTON, D C.

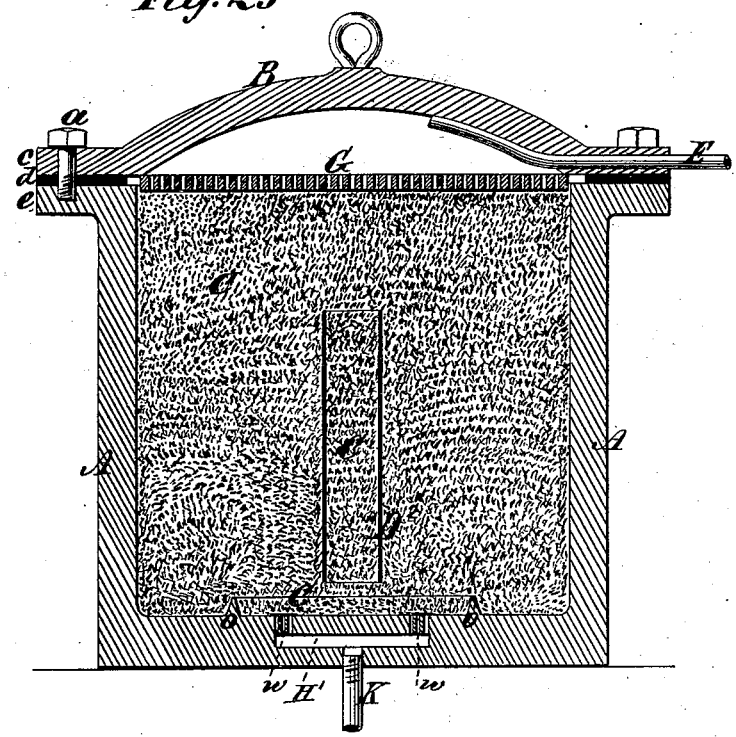

UNITED STATES PATENT OFFICE.

THOMAS R. SINCLAIRE, OF NEW YORK, N. Y., ASSIGNOR TO SINCLAIRE RECTIFYING MACHINE COMPANY, OF SAME PLACE.

IMPROVEMENT IN LIQUID-FILTERING APPARATUS.

Specification forming part of Letters Patent No. 183,599, dated October 24, 1876; application filed June 8, 1876.

*To all whom it may concern:*

Be it known that I, THOMAS R. SINCLAIRE, of the city of New York, in the county and State of New York, have invented certain new and useful Improvements in Apparatus for Filtering Liquids; and I do hereby declare that the following is a full, clear, and exact description of the same.

This invention relates to the improvement of the filtering apparatus formerly invented and patented to me for filtering and purifying spirits and other liquids; the present invention consisting in certain additions to the several parts, whereby the liquid treated is compelled to properly traverse the charcoal or other filtering medium by means of certain additions to the walls, diaphragms, receivers, ledges, and inlet and exit pipes, as will be hereinafter more fully explained.

The important results produced by my receiver or distributer, so called, in a filtering-vessel, as well as various arrangements thereof, are set forth in United States Letters Patent heretofore granted to me—for instance, Reissue No. 6,114, dated November 3, 1874, (original patent dated November 14, 1871;) Letters Patent No. 165,377, dated July 6, 1875; Letters Patent No. 171,056, dated December 14, 1875; Letters Patent No. 171,439, dated December 21, 1875, and Letters Patent No. 171,635, dated December 28, 1875.

The accompanying thirteen sheets of drawings illustrate the subject of the present application for patent; and the figures thereon will, for the sake of perspicuity, be hereinafter referred to in consecutive order.

A, in the several figures, designates the filtering-vessel, which may be of any suitable construction, and of any suitable shape or form; and B designates a cover, which is shown as secured to said vessel A by screw-bolts $a$, passing through the cover-flange $c$, and into the vessel-flange $e$, a suitable packing, say, of rubber $d$, being interposed between said flanges. C designates the filtering material, which may consist of pulverized charcoal, or bone-coal, or any other suitable substance. G designates a plate or diaphragm extending across the upper part of said vessel A, and E a pipe leading to a steam force-pump, P, by means of which the liquid to be filtered may be urged through the filtering material under pressure; but any other pressure-creating device, or static or other pressure, may, of course, be employed. The vessel A may be provided with ledges, shelves, or deflectors, or barriers and counter-ledges, constructed, arranged, and operating in many and various ways, as will be understood by reference to the Patent No. 171,056, hereinbefore referred to, and Patent No. 163,814, granted to me May 25, 1875; and also Letters Patent No. 169,857, granted to me November 9, 1875.

D, in the several figures, designates that part of, or feature in, the filtering apparatus which, when the apparatus is in operation, constitutes a receiver or distributer, accordingly as to whether the liquid being filtered progresses inwardly through the filtering material, or outwardly through the same. But, inasmuch as in the several figures (except in Fig. 2) I have shown the apparatus arranged for pursuing the method of filtration inwardly or centripetally, I will hereafter, for convenience, use the term "receiver" as indicating the device or feature referred to. The said receiver may be composed wholly or partially of some material which, by reason of its own nature, is permeable—for instance, pumice-stone, cement, and other porous mineral or earthy substances; sponge, cotton, or other suitable material of a fibrous or textile nature; shot, gravel, coal, stones, sand, or any other suitable lumpy, granular, comminuted, or disintegrated material; or any substance or substances which, when congregated, will present interstices through which the liquid can percolate. Or said receiver may be a well or space within the body of the filtering material, so arranged or formed, either mechanically or artificially, or by the action of the liquid itself, as to furnish a passage-way for the liquid from an interior portion of the vessel, whether the operation of filtering be centripetal or centrifugal, as will be more fully referred to hereafter.

Of course the apparatus may be provided with the necessary gages, safety and other valves, and pet and stop cocks.

In Fig. 1 the receiver D is shown as composed of shot inclosed in a bag, which is in communication with the pipe K, the orifice of this pipe being shown as covered with wire-gauze or other permeable material $v$. The bag is not only a convenient means of confining or sustaining the shot or other material composing the receiver D, but also serves to prevent the filtering material passing into or obstructing the said receiver. The inner surfaces of the sides and bottom of the vessel A are provided with ledges, shelves, or deflectors $s$ and $o$, respectively. The pipe K, which is screwed into the orifice $K'$ of the vessel, is also provided with ledges, shelves, or deflectors $l$, which latter are armed with counter ledges or deflectors $m$. I have also shown a steam force-pump, P, provided with a feed-pipe, E, and suction-pipe F, the feed-pipe E being provided with a check-valve, N, for the purpose of keeping the liquid from returning through said feed-pipe.

The obvious operation of the apparatus as shown in this figure (1) is this: The liquid to be filtered passes from the force-pump P through pipe E into the vessel A under pressure, and is caused to percolate through the pulverized charcoal C, or other suitable filtering material, toward the receiver D, and through it to the outlet-pipe K. The ledges or deflectors $s$, $o$, $l$, and $m$ all assist in deflecting the liquid into the mass of filtering material.

In Fig. 2 the receiver D is shown as composed of, say, gravel, or small stones built up from the bottom of the vessel A, and as being surrounded by the filtering material C. A convenient way to build such receiver is this: A stove-pipe, or other open-ended tube of the requisite size, may be placed with one end resting on the bottom of the vessel A, and filled with gravel or small stones, or whatever other material of which said receiver is to be composed, and the packing may be continued around this tube up to the intended top of the receiver thus built, when the pipe or tube can be withdrawn, or the pipe may be gradually withdrawn as the packing progresses around it. If the pipe or tube be perforated, or made of porous or permeable material, it need not be withdrawn. I have shown the bottom of the vessel A as provided with ledges $o$, and the pipe K as screwed into the orifice $K'$, the inwardly-projecting part of said pipe being perforated and extending into the receiver D.

And in this figure (2) I have also shown the apparatus arranged for pursuing the method of filtration outwardly or centrifugally, and for this purpose I have shown the force or feed pipe E of the pump P as connected with the pipe K or orifice $K'$; and I have also shown an outlet, $h$, for the filtered liquid, above the diaphragm G, which latter is shown as held against vertical displacement by means of pins or bolts $y$. For outward filtration the vessel may or may not be provided with a cover, as desired. The apparatus shown in this figure may also be caused to operate inwardly or centripetally by means of an exhaust-pump, attached to the pipe K or orifice $K'$, (say, the suction-pipe F of the pump P,) in which case a feed-pipe may be substituted for the outlet $h$, and the reservoir portion of the vessel made as capacious as desired. Or, indeed, the cover B could be used, and the vessel supplied through the feed-pipe from a tank located at any requisite or necessary elevation.

In Fig. 3 the receiver D is shown as constructed substantially in the manner shown in Fig. 2, and the upper end of the pipe K is also shown as screwed into the bottom of the vessel A, and a perforated plate, $v$, is shown as extending across the orifice $K'$, into which said pipe K is screwed; and the bottom of the vessel A is shown as provided with ledges or deflectors $o$. In this figure I have shown a permeable wall, $D'$, extending upward within the vessel A, so as to leave a space between it and the receiver D, which space may be filled or partially filled with any desirable filtering or cleansing material. This device $D'$ may be termed an "additional receiver."

Figure 5:
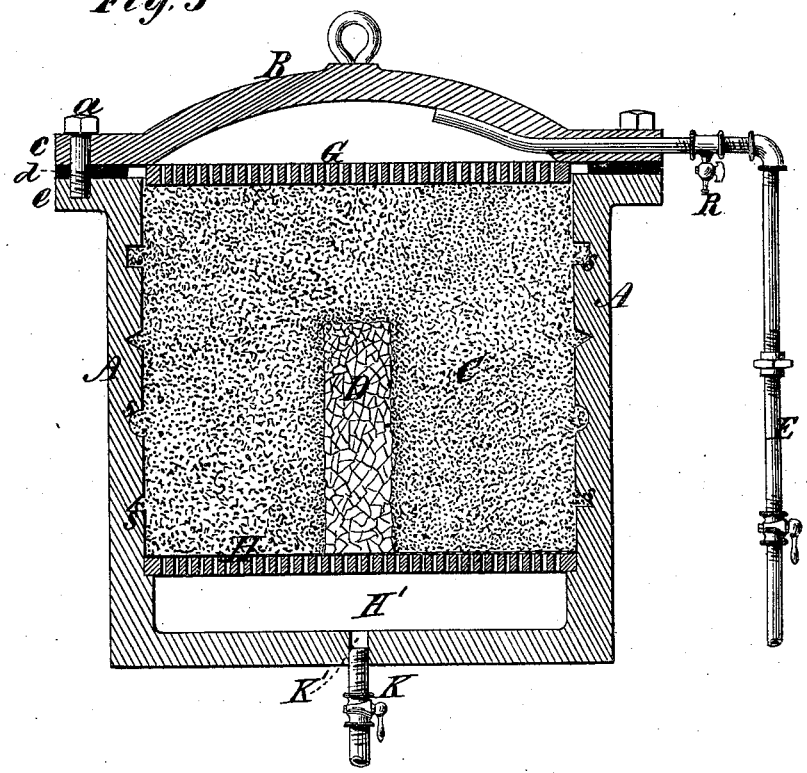
Figure 6:
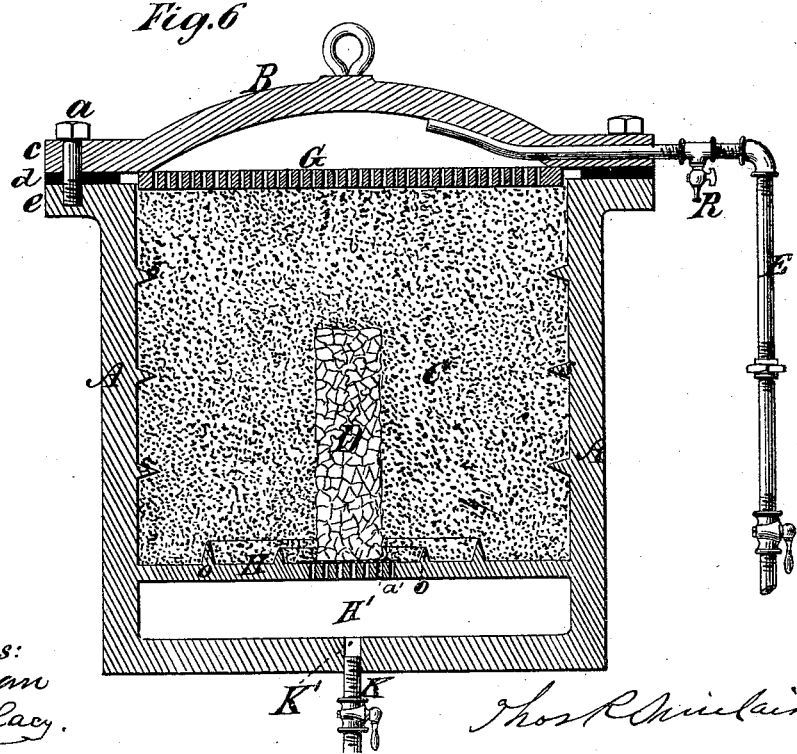

In Figs. 4, 5, 6, and 7 I have shown the vessel A as provided with a diaphragm or false bottom, H, elevated somewhat above the bottom of the vessel. The receiver D may rest upon or near this diaphragm H, as shown in Figs. 5, 6, and 7, or may be elevated above it, as shown in Fig. 4, so as to leave a space between the lower end of the receiver and the diaphragm, which space may be filled with the filtering material C, or any other suitable material. The pipe K is shown as screwed into the orifice $K'$, and as communicating with the space $H'$ below the diaphragm or false bottom H. The inner surfaces of the side walls of the vessel A, especially when the diaphragm H is wholly perforated, may be provided with circumferential grooves or recesses $s$, to serve as ledges or deflectors, as shown in Fig. 5, or with projecting ledges or deflectors $s$, as shown in Fig. 6; and the diaphragm H may be provided with ledges or deflectors $o$, as shown in Figs. 4 and 6. The diaphragm H may be wholly perforated, as shown in Figs. 5 and 7, or only partially perforated, leaving an impervious surface between the perforated portion and the side walls of the vessel A, as shown in Figs. 4 and 6, and the perforations may be covered with wire-gauze, canvas, or any suitable material, $a'$, if desired. And said diaphragm may be provided with liquid-tight joints where it joins the vessel A, as shown in Figs. 4 and 6.

It is obvious that the diaphragm H may be dispensed with, and the bottom of the vessel itself wholly or partially perforated, and the perforations covered with wire-gauze, felt, or canvas, and that the impervious surface of said bottom may be provided with ledges $o$, if desired. And it is also obvious that the bottom of the vessel need not be perforated, in which case the orifice $K'$ may be provided with a perforated or permeable plate or mouth-piece, as shown in Fig. 3.

In Fig. 4 I have shown the vessel A as conical or tapering, and the diaphragm H as provided with an impervious outer surface. By so constructing the vessel with tapering sides and an impervious bottom surface the filtering material will not only become firmly compacted against such impervious bottom surface, but will also be tightly wedged or compacted against the conical or tapering sides, thereby not only tending to prevent the channeling of the liquid along such tapering sides, or between the same and the filtering material, but also tending to prevent such channeling along the bottom surface or between it and the filtering material.

It is obvious that the side walls of the vessel, instead of being tapering, as shown in Fig. 4, may be made more or less circular or concave, and still operate in substantially the same manner as the tapering walls. In Fig. 4ª I have shown a vessel constructed with such circular or concave side walls, the diaphragm H being dispensed with in this instance, and the orifice in the bottom of the vessel shown as provided with a perforated plate or mouth-piece, $v$, for preventing the filtering material from passing through said orifice.

In Fig. 7 the bottom of the vessel is constructed with an inwardly-projecting ridge or rib, $f$. The said projection or ridge $f$ is shown as supporting the diaphragm H, below which is shown the space H'. The vertical inclined portion $g$ of the inner surface of the bottom of the vessel A may be said to constitute an annular ledge or barrier, so that the liquid, in channeling up along such surface to reach the receiver, would have to contend against the weight of the filtering material and the weight of the liquid above it, and such of the artificial pressure as tends to cause the mass of filtering material to cleave to such surface $g$. I have also shown in this figure a ledge or obstruction, $l$, which may be cast with or attached to the vessel A, or to the diaphragm H, and which may have liquid-tight joints where necessary. And in Fig. 7ª I have shown the vessel A as having conical or tapering sides, and as provided with a centrally-perforated convex plate or diaphragm, H. The impervious portion $g'$ of this convex diaphragm acts as a barrier, ledge, or obstruction to the passage of the liquid in manner similar to that stated with reference to the inclined surface $g$, shown in Fig. 7. I have shown this surface $g'$ as carrying a ledge or deflector, $l$. In Fig. 7ª I have shown the diaphragm H, rib $f$, surface $g$, and ledge $l$ as applied to a vessel having tapering, concave, or circular walls.

In Fig. 8 the receiver D is shown as composed of sponge, and as elevated above the impervious bottom of the vessel A, and into said receiver there projects the pipe K, which is shown as armed with ledges or deflectors $l$. In this figure the mouth of the pipe K is shown as open, or unprovided with wire-gauze or other permeable material, and thus it will be seen that the mouth of the pipe K or the orifice K' may or may not be provided with permeable or reticulated material, accordingly as circumstances may require, in view of the material of which the receiver is made, or of the material surrounding the mouth of said pipe or orifice.

In Fig. 9 I have shown the receiver D as composed of cotton, and as resting upon the bottom of the vessel A, which latter is shown as provided with ledges $o$. In this instance the pipe K is shown as screwed through the bottom of the vessel, and as provided with a bell-shaped upper end or rose, and also with ledges $l$; and I thus, in effect, have two receivers—one D and the other K—the latter being armed with the aforesaid ledges $l$. I have also shown the feed-pipe E provided with a check-valve, N, and a pet-cock, R, the latter being for the purposes of testing the accuracy of the check-valve N and to allow samples of the liquid to be drawn.

In Fig. 10 I have shown a receiver, D, of spherical form, into which projects the pipe K. The inner surface of the side and bottom walls of the vessel A are shown as provided with ledges, shelves, or deflectors $s$ and $o$, respectively. In this figure I have shown the said receiver D as occupying a central position within the vessel A; and I have also shown the pipe K as provided with ledges $l$ and counter-ledges $m$, which may be rigid or flexible, of any suitable number, size, or shape, and arranged in any desirable manner. I have also shown the feed-pipe E as provided with a check-valve, N, and trial or pet cock R.

Figure 11:
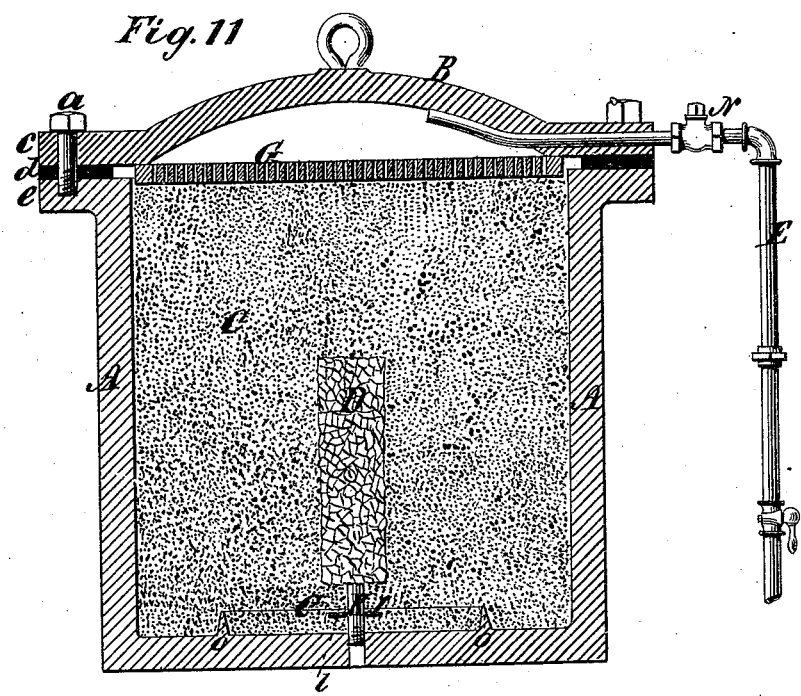

In Fig. 11 I have shown a receiver, D, composed of the coarser particles selected or sifted from the filtering material C, and as being elevated somewhat above the bottom of the vessel A. The pipe K is shown as extending to and communicating with the lower end of said receiver, and said pipe is also shown as provided with ledges, shelves, or deflectors $l$. I have also shown the bottom of the vessel A as provided with ledges $o$, and the feed-pipe E is shown as provided with a check-valve, N.

Figure 12:
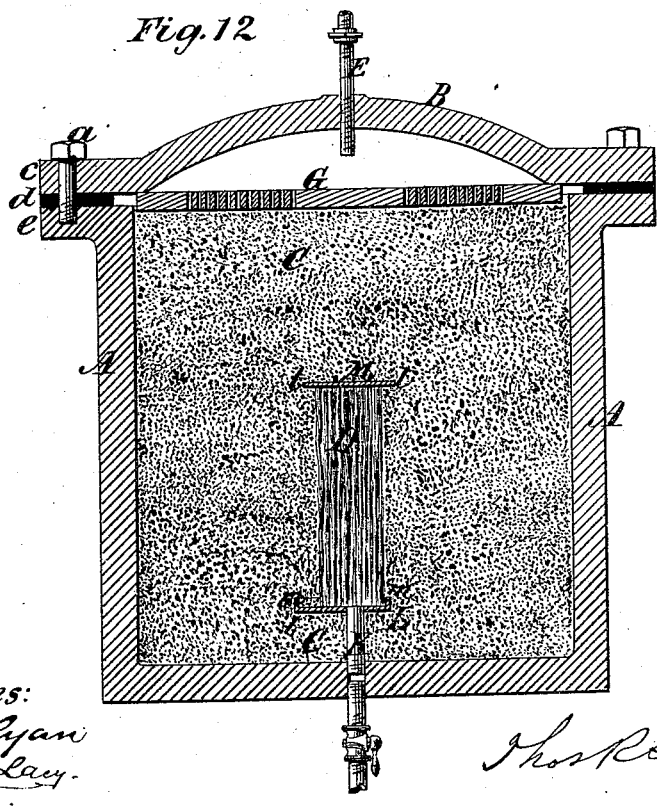

In Fig. 12 I have shown the receiver D as composed of straw or twigs, and as elevated above the bottom of the vessel A and resting upon a plate, L, which plate is shown as located at the upper end of the pipe K; and I have also shown a plate, M, as resting upon the top of the receiver D. These plates may be provided with deflecting projections or extensions in various ways, to constitute ledges $l$ or counter-ledges $m$, as will be understood by reference to said Fig. 12. The said plates may be made, in whole or in part, of any suitable pervious or impervious, flexible or rigid material, as found desirable. And in this figure I have shown the feed-pipe E as entering through the top of the cover B, and the diaphragm G as having an impervious central portion for the entering liquid to impinge against.

In Fig. 13 I have shown the receiver D as extending from the bottom of the vessel A up to an impervious plate, G, and I have shown this plate G as provided on its lower surface with ledges u. The vessel A is shown as provided on the bottom with a ledge or deflector, o, and as having a ledge or deflector, s, at or near the point of junction of the tapering sides, with the concave or circular bottom, which latter ledge or deflector answers the purpose of both a side and bottom ledge, and it may be provided with a counter-ledge, m, if desired. I have also shown a concavo-convex perforated plate, v, obstructing the orifice K' at the upper end of the pipe K.

In said Fig. 13 I have shown the sides of the vessel A as being conical or tapering, and the bottom thereof as being circular or concave; and in Fig. 13ª I have shown the sides of the vessel A as being circular or concave and the bottom thereof as being conical or tapering. The advantage of thus forming the vessel is, that the filtering material will not only pack more tightly against the sides, but will also become more firmly compacted or wedged in the bottom, thereby offering a greater resistance to the passage of the liquid between such surfaces and the filtering material. It is, of course, obvious that a diaphragm, H, similar in shape to the bottom of the vessel, may be employed, if desired, said diaphragm being made impervious between its orifice and the walls of the vessel A, and having liquid-tight joints where it joins said walls, as shown in Fig. 13ª'.

In Fig. 14 I have shown the receiver D as resting upon the circular or concave bottom of the vessel A, and the pipe K or orifice K' as provided with a perforated or permeable plate or mouth-piece, v. In this figure I have also shown as distributed at divers points in the felting material C a number of primary or relief receivers, Z, which said receivers Z may be made wholly or partially of the same material as that of which the receiver D is constructed, or of any other suitable material, and they may abut against the receiver D or be separate therefrom, with packing C intervening, or made to communicate by pipes or otherwise. These primary or relief receivers Z, possessing less resisting power than the said filtering material C, serve as reliefs to at least some portion of the liquid in its progressive course.

Figure 15:
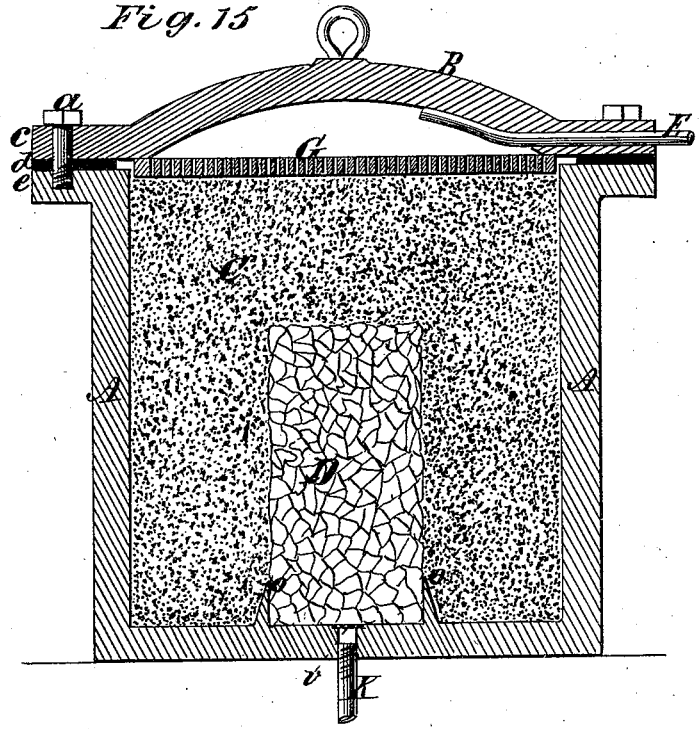

In Fig. 15 I have shown a continuous ledge, o, (annular in the present instance,) projecting upwardly from the bottom of the vessel A sufficiently high to permit of there being placed within the surrounded space any suitable material to constitute a receiver. And I have shown the receiver D as not only constructed within the space surrounded by the annular ledge o, but also as extending upward therefrom into the filtering material. It will thus appear obvious that I am enabled to employ even the ledges themselves in the formation or construction of a receiver.

Figure 16:
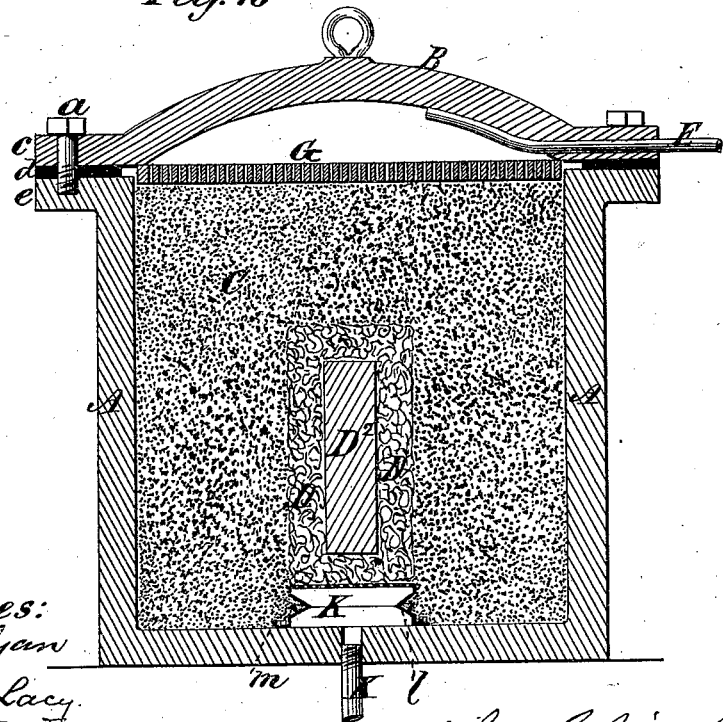
Figure 17:
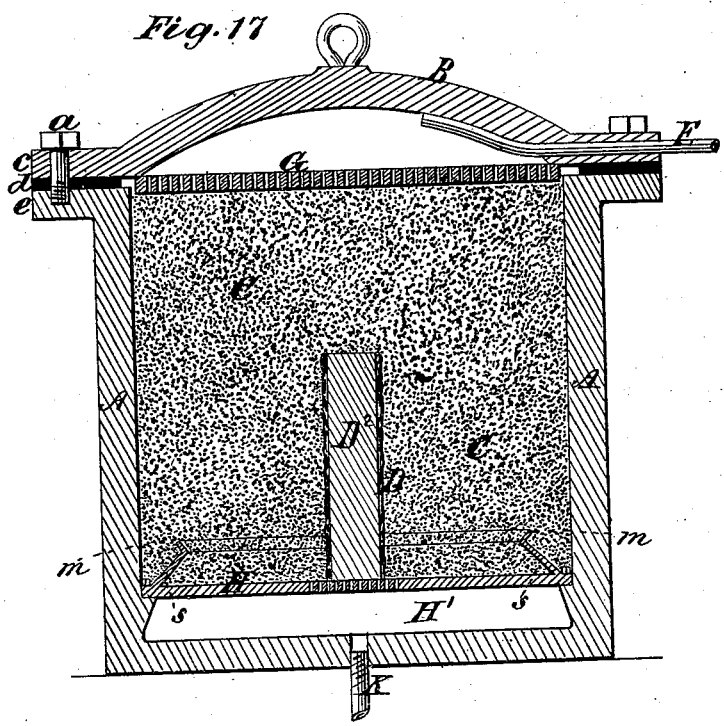

In Figs. 16 and 17 I have shown a receiver constructed, in part, of some pervious or impervious material, D², surrounded, or partly surrounded, by any of the materials which I have hereinbefore mentioned or referred to as capable of being used in constructing receivers.

In Fig. 16 the receiver is shown as elevated above the impervious bottom of the vessel A, and as resting upon the perforated top of an enlarged pipe or secondary receiver, K, which communicates with said receiver D; and I have shown the pipe K as provided with a circumferential recess or groove, l, to serve as a deflector, within which I have shown a ledge or counter-ledge, m.

And in Fig. 17 I have shown the receiver as composed of a block of wood, with its porous or permeable bark left on, and as resting upon a centrally-perforated diaphragm, H. In this figure I have shown a ledge, s, provided with a counter-ledge, m, projecting outward at the point of junction of the diaphragm H with the vessel A, which arrangement, as before stated with reference to Fig. 13, allows said ledge s to perform the functions of both a side and bottom ledge. It is, of course, obvious that such ledge can be arranged at other corners, at top or bottom of filtering-vessels. And in this figure I have shown the pipe K as communicating with the space H' below said diaphragm.

Figure 18:
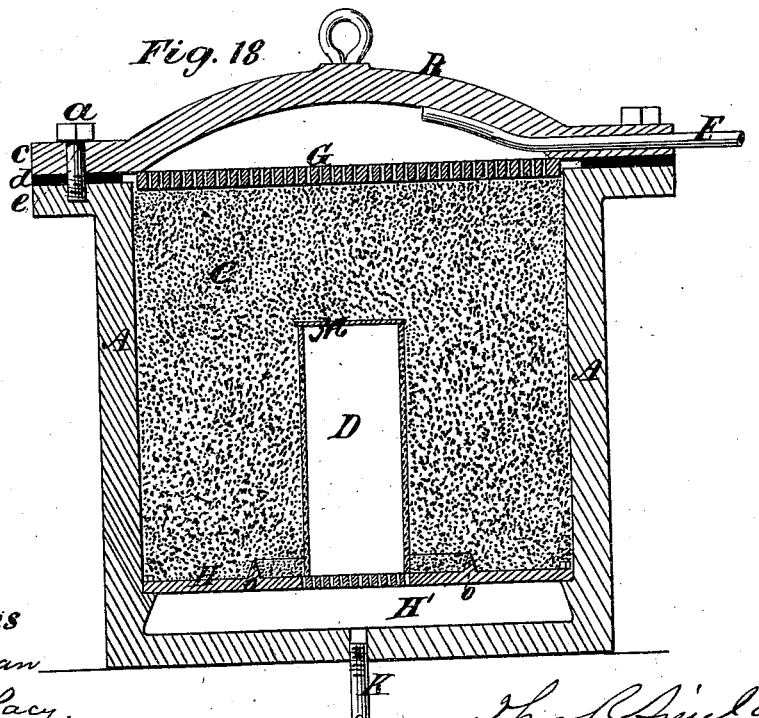

In Fig. 18 I have shown the vessel A as provided with a centrally-perforated diaphragm or false bottom, H, a space, H', below it, and a pipe, K, communicating with said space H'. Ledges o are represented as projecting upward from said diaphragm. D is a space or hollow receiver, shown as formed over the central perforations of the diaphragm H. The walls of this open space may be constructed or built in various ways, and of various material, so as to be wholly or partially permeable; for instance, as shown in the drawing, a porous cement drain or sewer-pipe may be set over the perforations in the diaphragm H, and the filtering material proper packed around it, and the upper end of such space or such pipe may be covered by a plate, M, as shown, which plate may be pervious or impervious, as desired. Or a wall of stones or other substance or substances may be built up, which wall could be strengthened by any suitable cementing or binding material, and be so constituted in various ways as to permit the liquid to percolate through it. Or, in some instances, the filtering material itself could be provided with a hollow space, to constitute a receiver: a convenient way of doing this would be to use a form, of any suitable material, size, or shape—say, a block of wood—around which the filtering material may be placed, and the block withdrawn. Of course it will appear obvious that if the filtering material is of such a character that it will be likely to destroy the integrity of the well, space, or receiver D by falling or caving in, such filtering material may be rendered more self-sustaining and resistible around the space by using some suitable cementing or adhesive substance when placing the filtering material around the block. And it is also obvious that the plate M may be used at the top of such well, space, or receiver D. It is also obvious that the diaphragm H may be dispensed with, and the space or well extend up from the bottom of the vessel A; or, indeed, the bottom of the well, space, or receiver D need not extend to the diaphragm or to the bottom of the vessel; but there may be filtering material packed or placed between it and the said diaphragm or the bottom of the vessel, (see Fig. 4,) and in such case the bottom of the well, space, or receiver may, if desired, rest upon a plate, L. (See Fig. 12).

In Fig. 19 I have shown the bottom of the vessel provided with a space, H', communicating with the pipe K; and I have also shown an annular ledge, $o$, projecting from the inner surface of the bottom of the vessel A. $D^2$, in the present instance, is a block of wood, of cylindrical form, projecting into the packing C; and it is shown, in this instance, as resting upon the bottom of the vessel. Around this block I have shown the bottom of the vessel as provided with a number of holes or perforations, $w$, which establish communication between the interior of the vessel and the space H'. These perforations may be large or small, as desired, and, if too large to keep back any particular packing or filtering material, they may be covered by perforated or reticulated metal, and felt or muslin, (any or all,) or any other suitable material, the object being to afford a passage for the liquid from or to the vessel, (according to the direction of the filtration,) and at the same time to keep the packing C from passing through such perforations. The receiver D is shown in this figure, (19,) as in the preceding figure, as being a space located within the body of the filtering material; but in this instance the receiver is a space surrounding the block $D^2$, and communicating with the openings $w$ and pipe K. This space or receiver D can be readily formed by merely revolving, working, or moving the block $D^2$, so as to press or crowd the packing C away from it, because when the apparatus is in operation the liquid will keep the receiver, space, or passage D, thus formed, open or unobstructed as it passes along the sides or outside surfaces of the block $D^2$. And I will here state that it is not necessary in all cases that this space should be formed around the block $D^2$ by revolving, working, or moving the said block, because, in practice the liquid will impinge against the surfaces of the block $D^2$, and by its own action form a space, passage, or receiver, D. And I will further state that the nature of some filtering material is such that it will not pack so closely against the said block or form $D^2$ but that spaces or passages will be left adjacent to the block or form, or between it and the filtering material, through which spaces or passages thus left the liquid can flow or pass to or from the pipe K, as shown in Fig. 19$^a$.

The block or form $D^2$ may be made of any suitable rigid, elastic, or yielding material, and of any suitable size or shape, and may be a permanent, detached, or detachable part of the apparatus. And I will here state that if the form $D^2$ be made of some elastic or yielding substance, such, for instance, as a mass of india-rubber, the space, passage, or receiver D would be more easily formed or enlarged around such mass or form $D^2$ by reason of the compressible or yielding nature of such substance. And it is obvious that the block or form $D^2$, instead of resting upon the bottom of the vessel, as shown, may be elevated above it with filtering material intervening. (See Fig. 4).

In Fig. 20 I have shown the block $D^2$ provided with a cavity or well, $D^3$, at its lower end, while its upper portion presents an impervious surface for the liquid to impinge against and find or form a passage-way along its surface to enable it to communicate with the pipe K through the perforations $z$ leading into the said cavity or well $D^3$. The block or form $D^2$ may, whenever found desirable, be held or secured to the bottom of the vessel A, which may be done in various ways, and, as an example, I have merely shown a short pipe, one end of which screws into the block $D^2$, and the other into the bottom of the vessel. I have also shown the lower portion of the block $D^2$ below the perforations $z$ as provided with ledges $l$. And in this figure I have shown a number of deflecting plates, Q, so arranged or disposed in the packing material C as to direct the liquid to or from the block $D^2$, as well as to expedite its passage by furnishing surfaces along which it may readily pass; or, instead of plates, hollow tubes or pipes may be employed, which tubes or pipes may be filled with filtering material, if desired, and their ends may be covered with any suitable reticulated or permeable material. As an example I have shown two of these hollow tubes or pipes in this figure, (20.)

Figure 21:
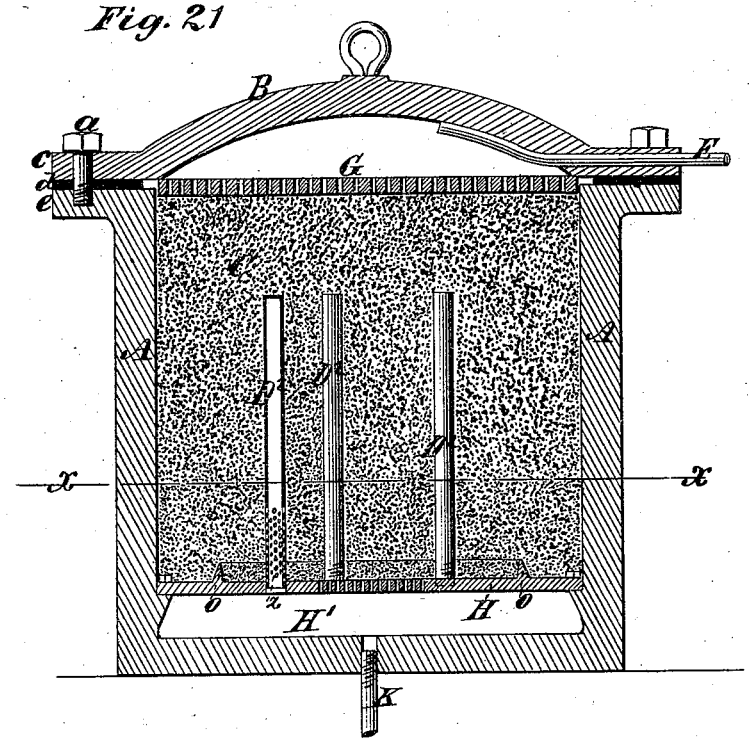
Figure 22:
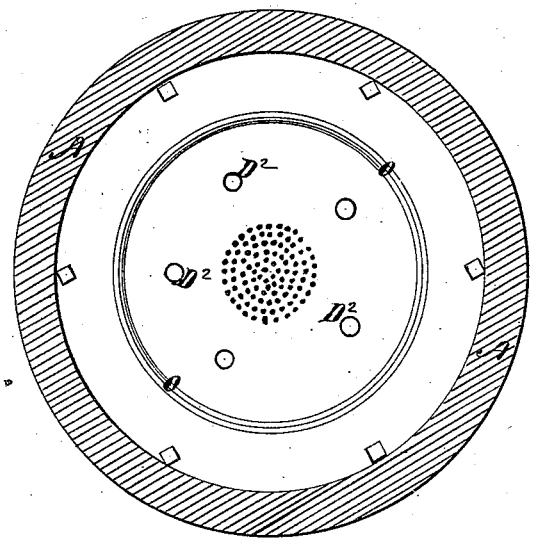

In Fig. 21, which is a central section of the apparatus, and in Fig. 22, which is a transverse section thereof taken on the line $x\,x$ of Fig. 21, I have shown an obvious and simple way of arranging more than one impinging device $D^2$. In this instance a number of ordinary pipes or tubes with their upper ends closed are screwed into a diaphragm, H, provided with central perforations and with an annular ledge, $o$, encompassing said perforations. In respect to these several devices $D^2$ the space, passage, or receiver D may be mechanically or naturally formed, as hereinbefore stated. Of course the diaphragm H may be dispensed with, and the pipes or tubes screwed into or attached to the bottom of the vessel. In Fig. 21 I have shown one of the pipes or tubes, D², as having perforations $z$ at its lower end, through which perforations communication is established with the space H'.

In Fig. 23 I have shown the impinging device or form D² as being an impervious pipe or tube, open at both ends, and elevated above the bottom of the vessel A, within and surrounding which pipe or tube the filtering material C is placed, thus presenting both an inside and an outside impinging surface. The respective ends of said pipe or tube can be provided with plates L and M, (see Fig. 12,) and said pipe or tube may or may not contain filtering material as found desirable, and, instead of being elevated as shown, it can rest upon the bottom of the vessel A. Or, after packing both within and around it, said pipe or tube may be withdrawn, (and a plate, M, used, if desired,) when the space thus left between the inside and outside packing will form the receiver D. In this figure I have also shown the bottom of the vessel A as provided with ledges $o$.

What I claim as my invention, and desire to secure by Letters Patent, is—

1. The combination, with a filtering-vessel, A, and an inwardly-projecting pipe or receiver, K, of one or more ledges or deflectors, $l$, and with or without counter-ledges $m$, substantially as herein shown and described.

2. The combination, with a filtering-vessel, having a longitudinally tapering, concave, or circular side wall (or walls,) of a bottom, or bottom diaphragm, provided with an impervious surface surrounding the orifice, passages, or perforations, the said bottom orifice, passages, or perforations being so covered or so arranged or constructed that the filtering material will not pass through the same in the operation of filtration, substantially as described.

3. The combination, with a filtering-vessel, A, of the inclined surface $g$, and a ledge or obstruction, $l$, substantially as herein shown and described.

4. The combination, with a filtering-vessel, having a longitudinally tapering, concave, or circular side wall (or walls,) of the inclined surface $g$, substantially as herein shown and described.

5. The combination, with a filtering-vessel, A, of the inclined surface $g'$, with or without a ledge or obstruction, $l$, substantially as herein shown and described.

THOS. R. SINCLAIRE.

Witnesses:
MICHAEL RYAN,
A. J. DE LACY.